(No Model.)
H. BOHLS.
CIGARETTE MACHINE.
No. 554,575.
Patented Feb. 11, 1896.
11 Sheets—Sheet 3.
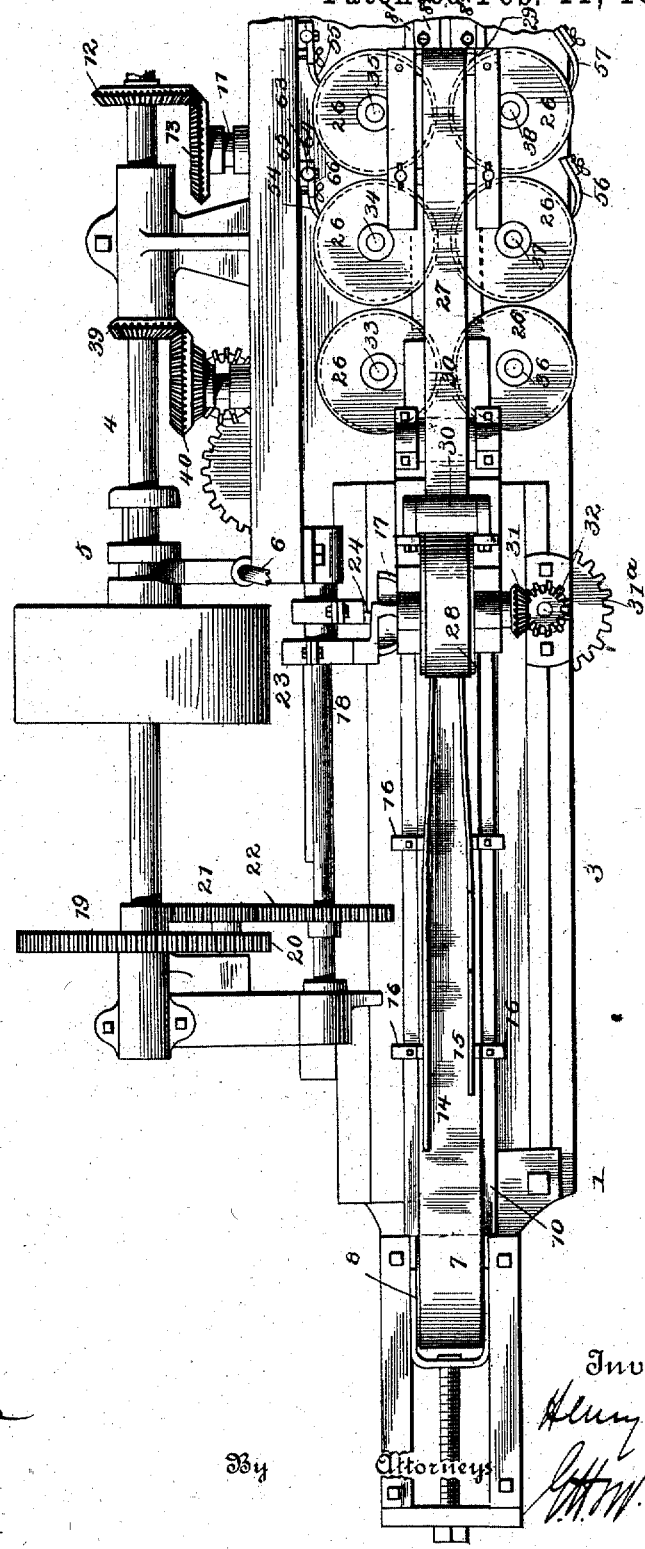
Witnesses
Inventor
Henry Bohls,
By
Attorneys

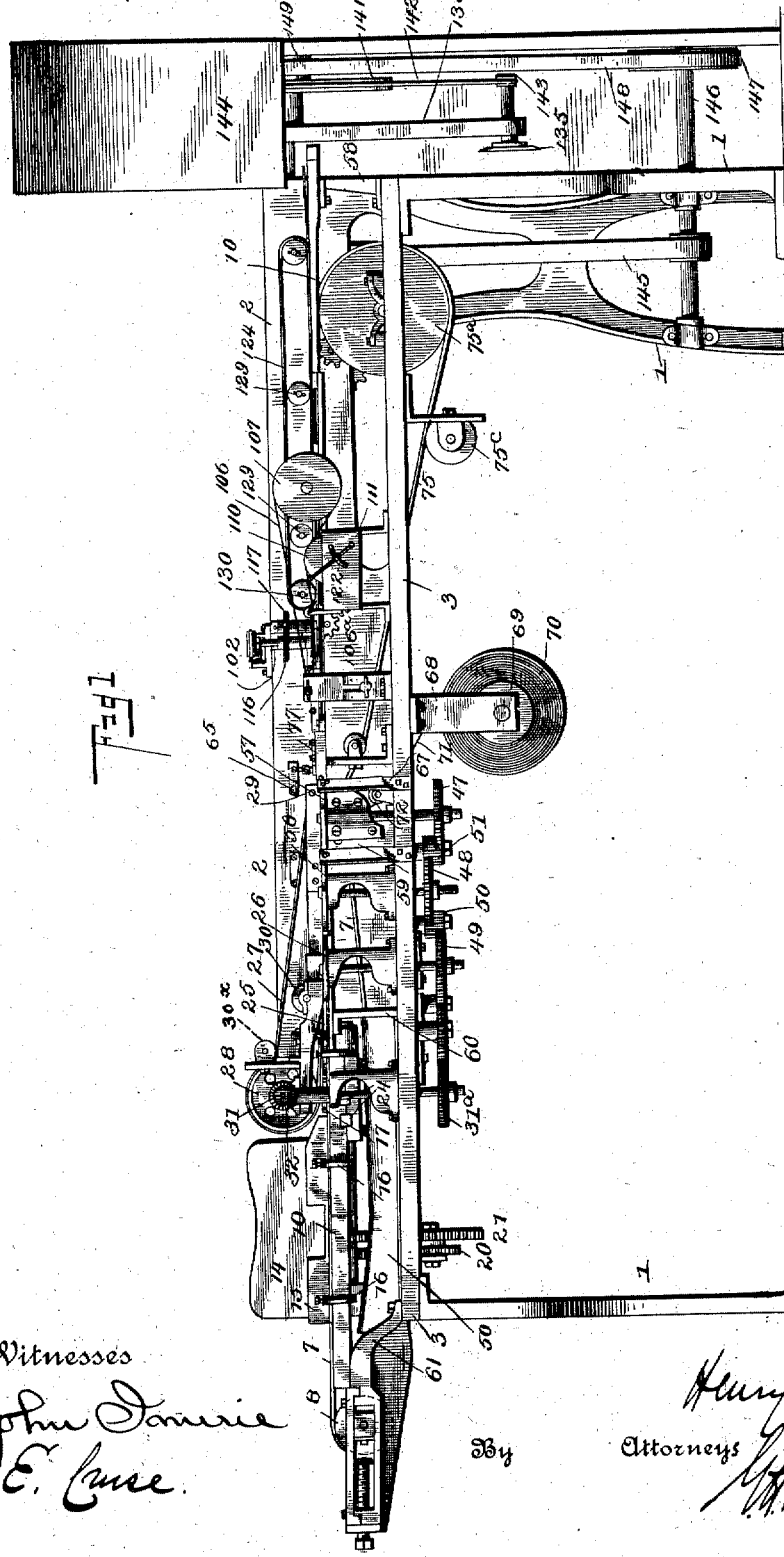

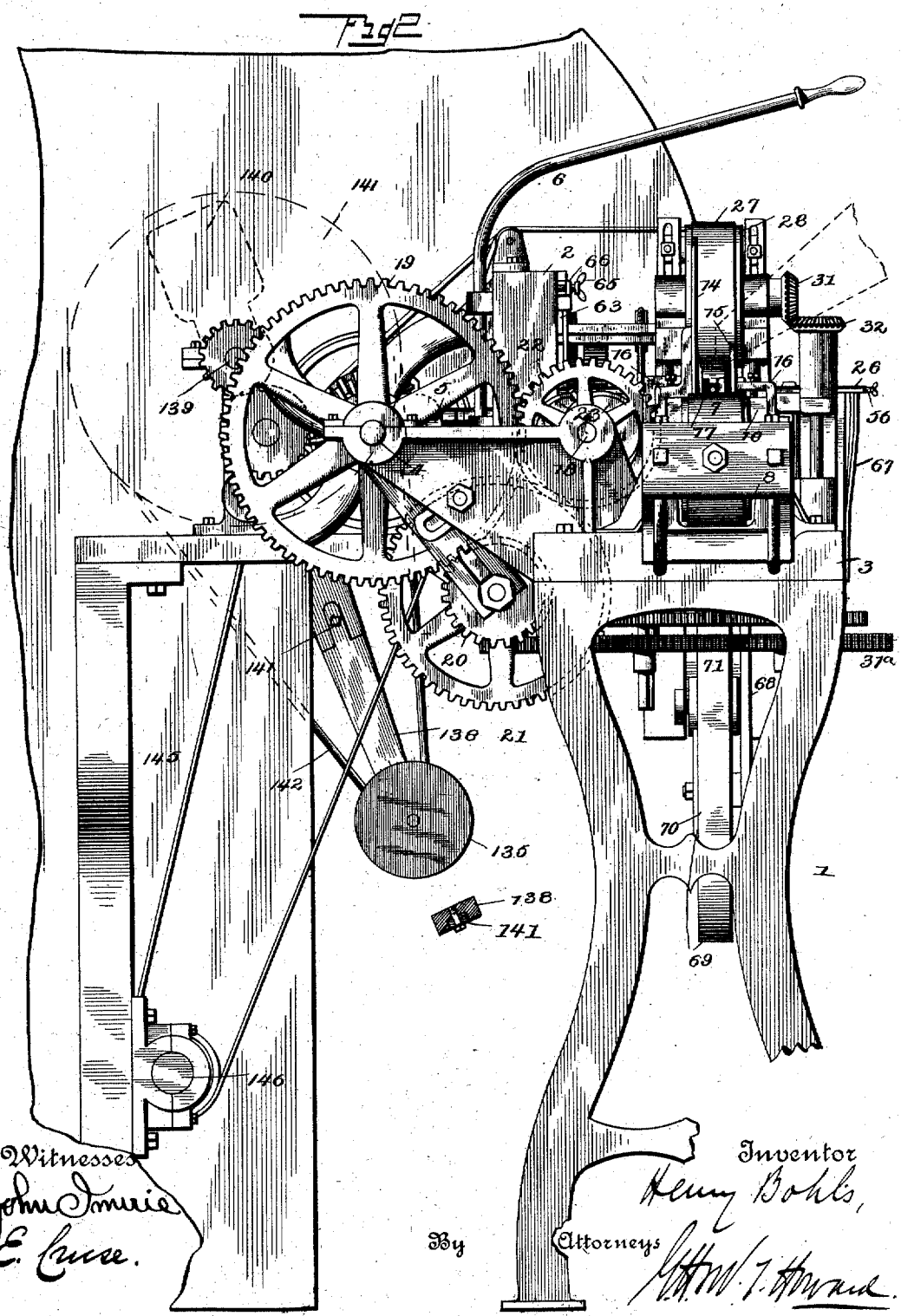

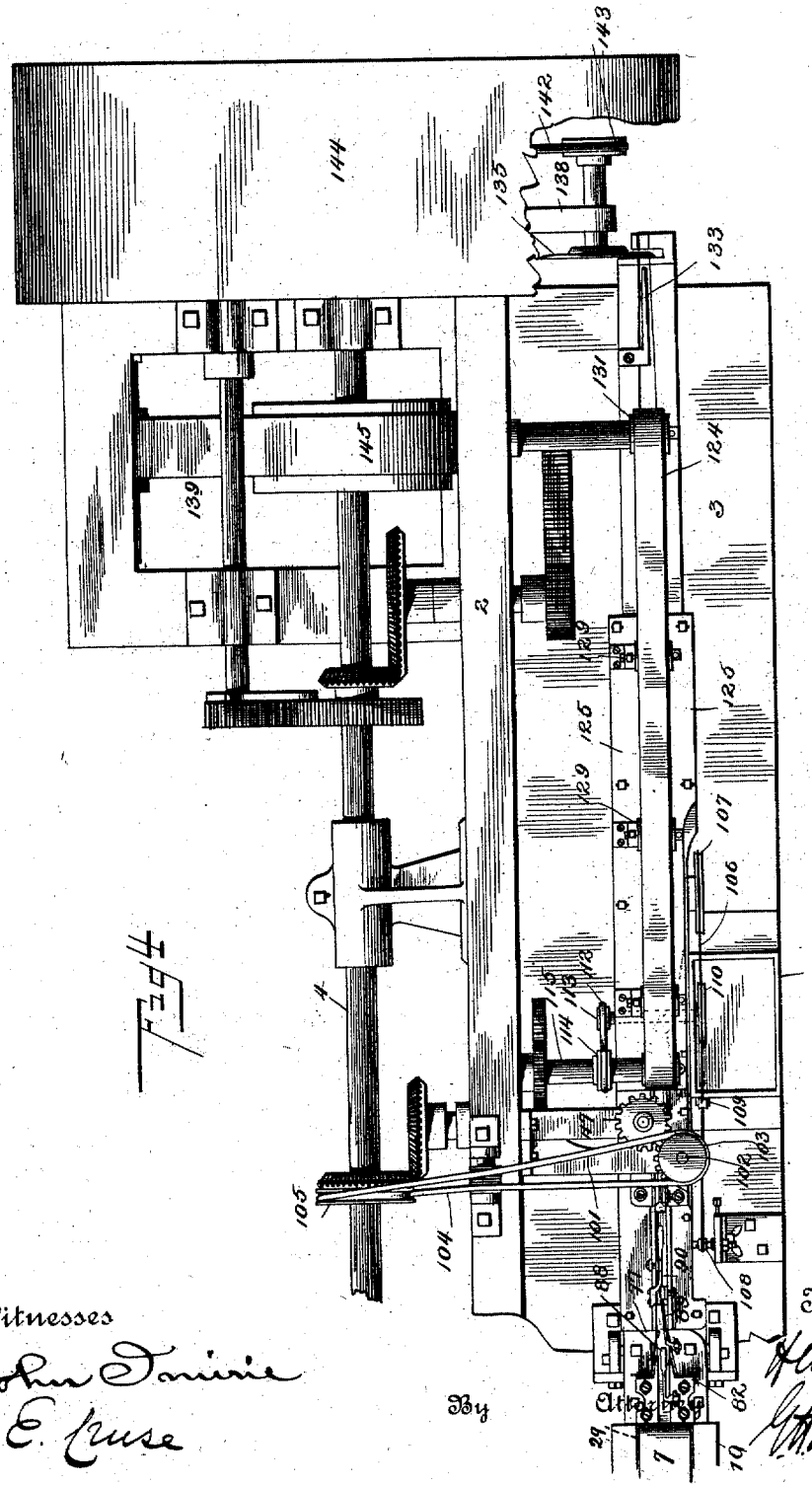

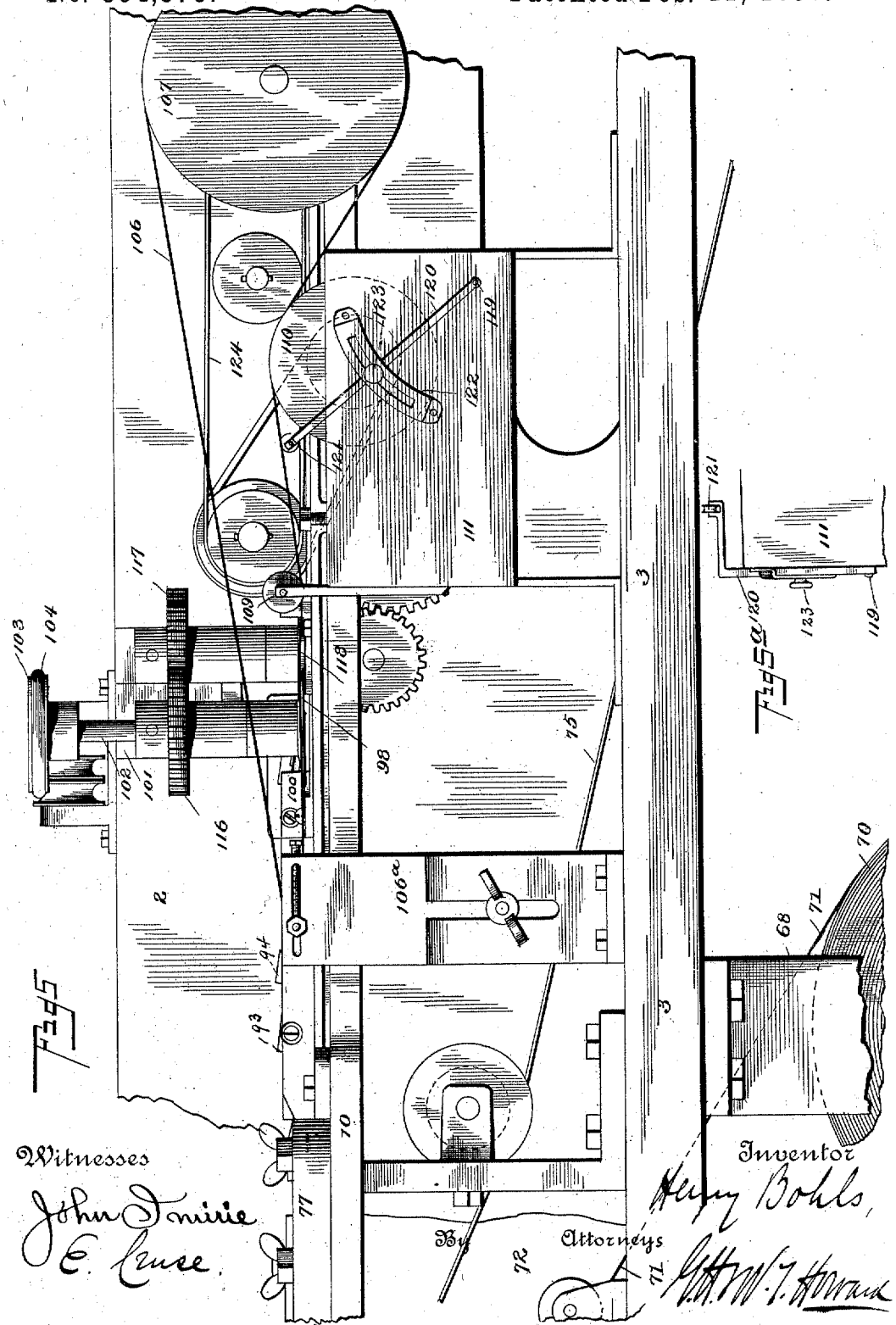

(No Model.) 11 Sheets—Sheet 6.
H. BOHLS.
CIGARETTE MACHINE.
No. 554,575. Patented Feb. 11, 1896.
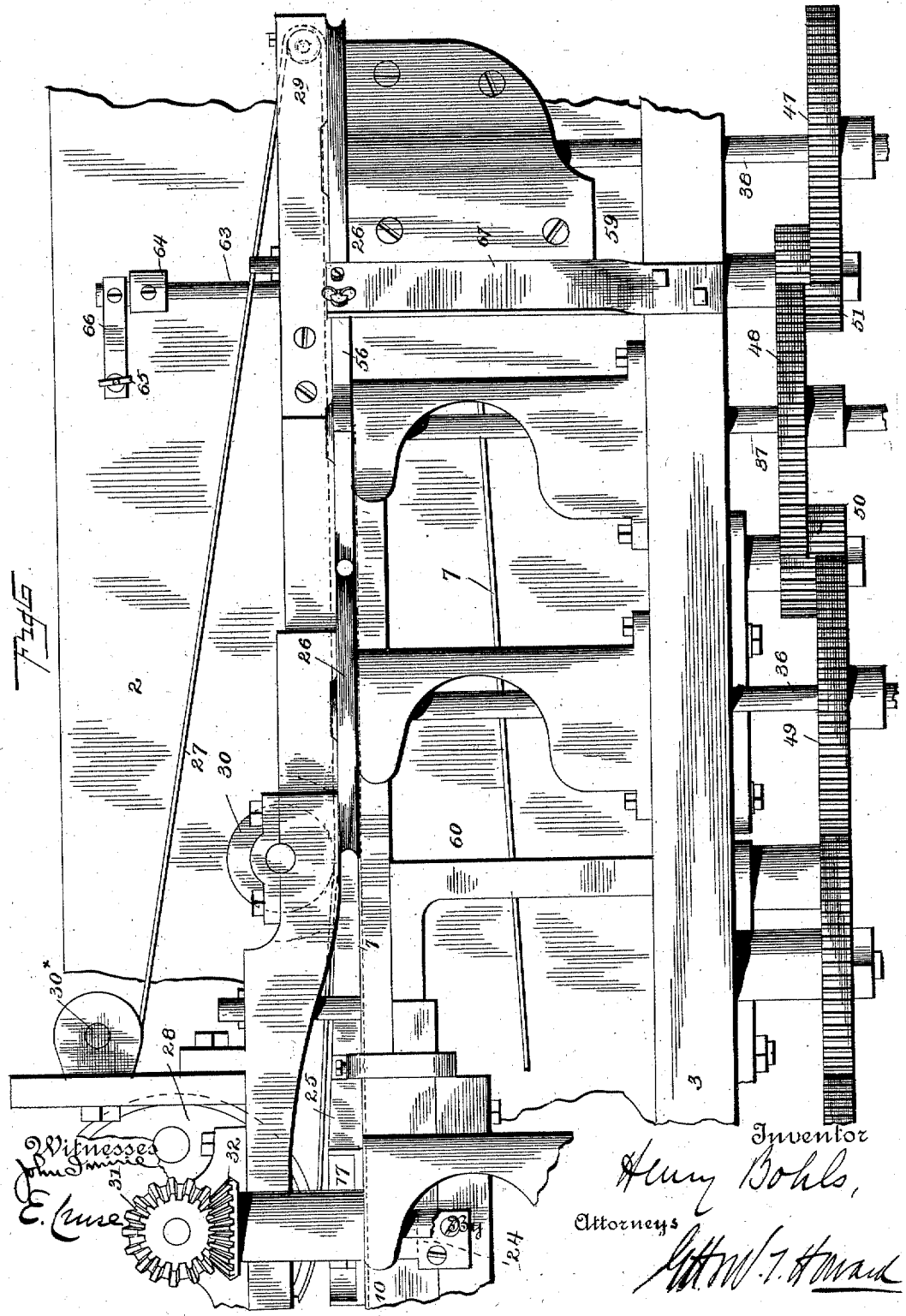
Witnesses
Inventor
Henry Bohls,
Attorneys (No Model.) 11 Sheets—Sheet 7.
H. BOHLS.
CIGARETTE MACHINE.
No. 554,575. Patented Feb. 11, 1896.
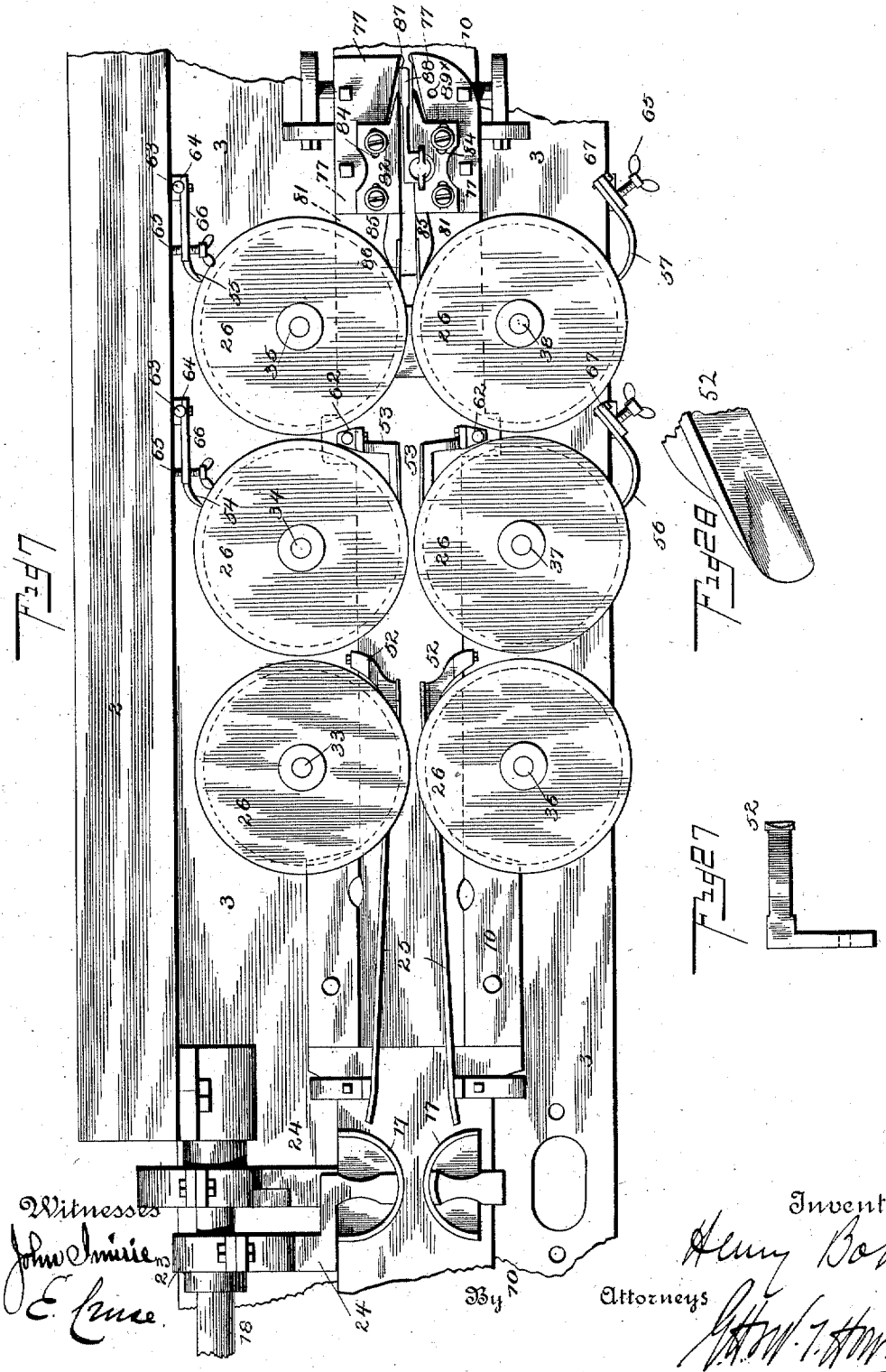
Witnesses
John Imirie
E. Cruse
Inventor
Henry Bohls
Attorneys

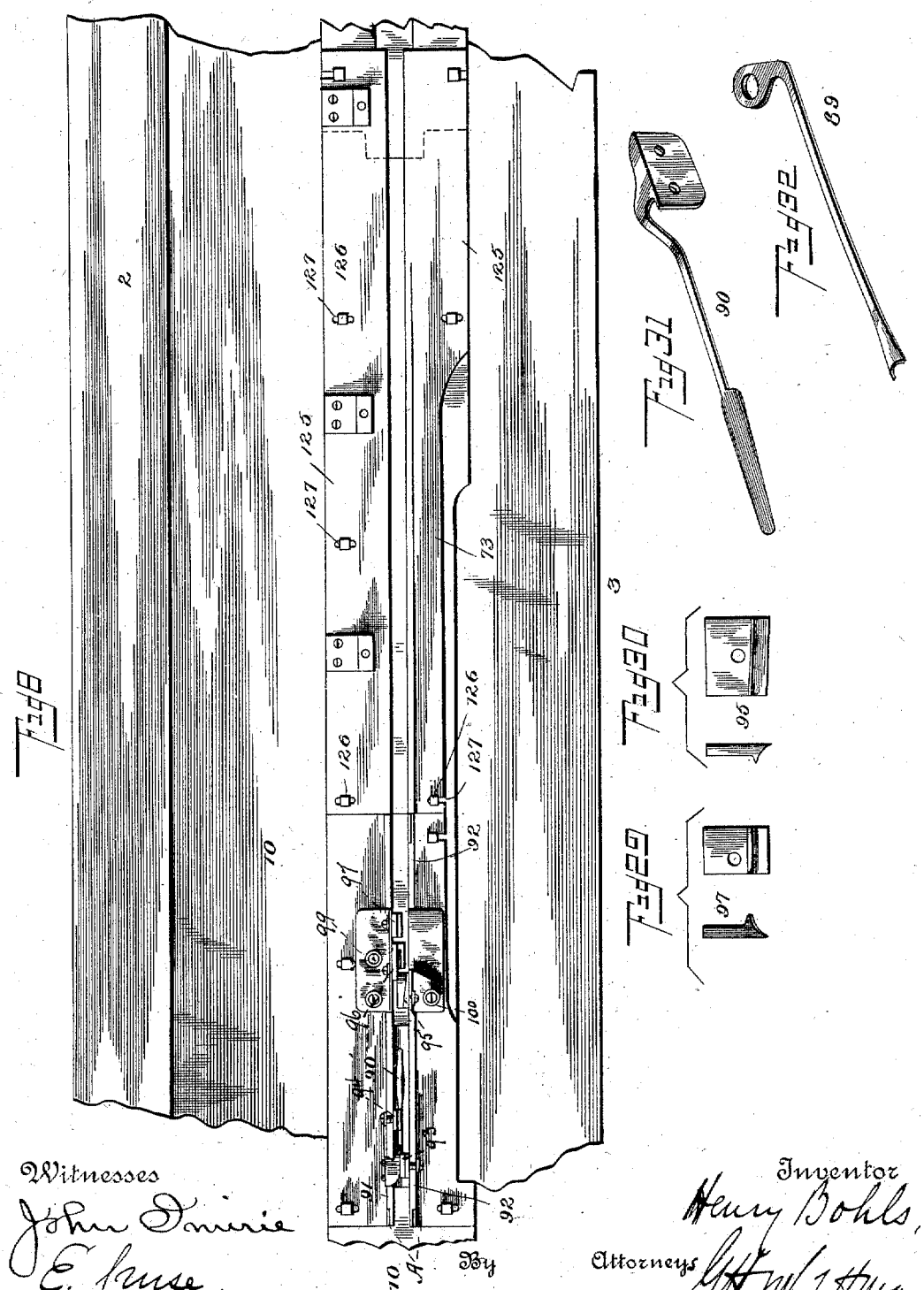

(No Model.) 11 Sheets—Sheet 9.
H. BOHLS.
CIGARETTE MACHINE.
No. 554,575. Patented Feb. 11, 1896.
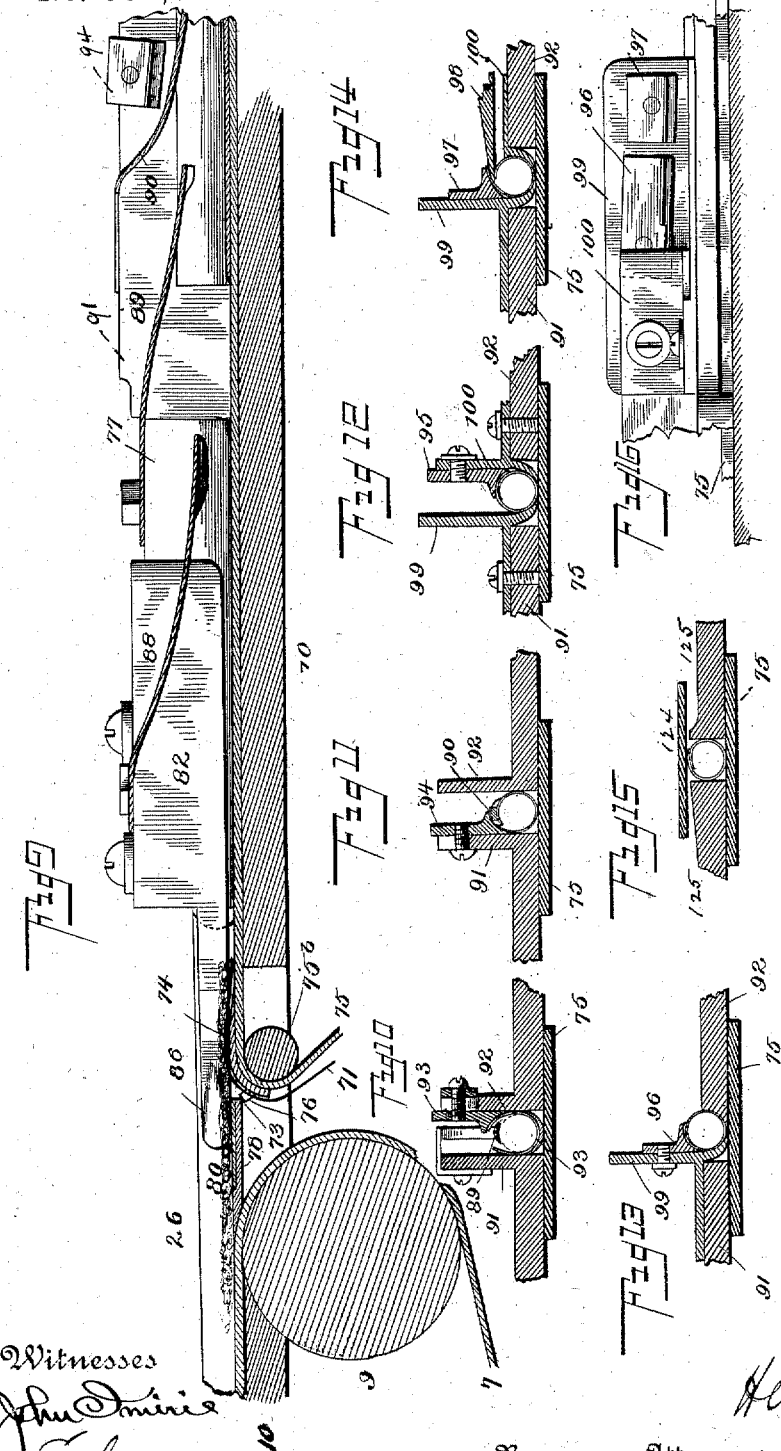
Witnesses
John Imire
E. Cruse
Inventor
Henry Bohls,
By Attorneys
G. H. W. T. Howard

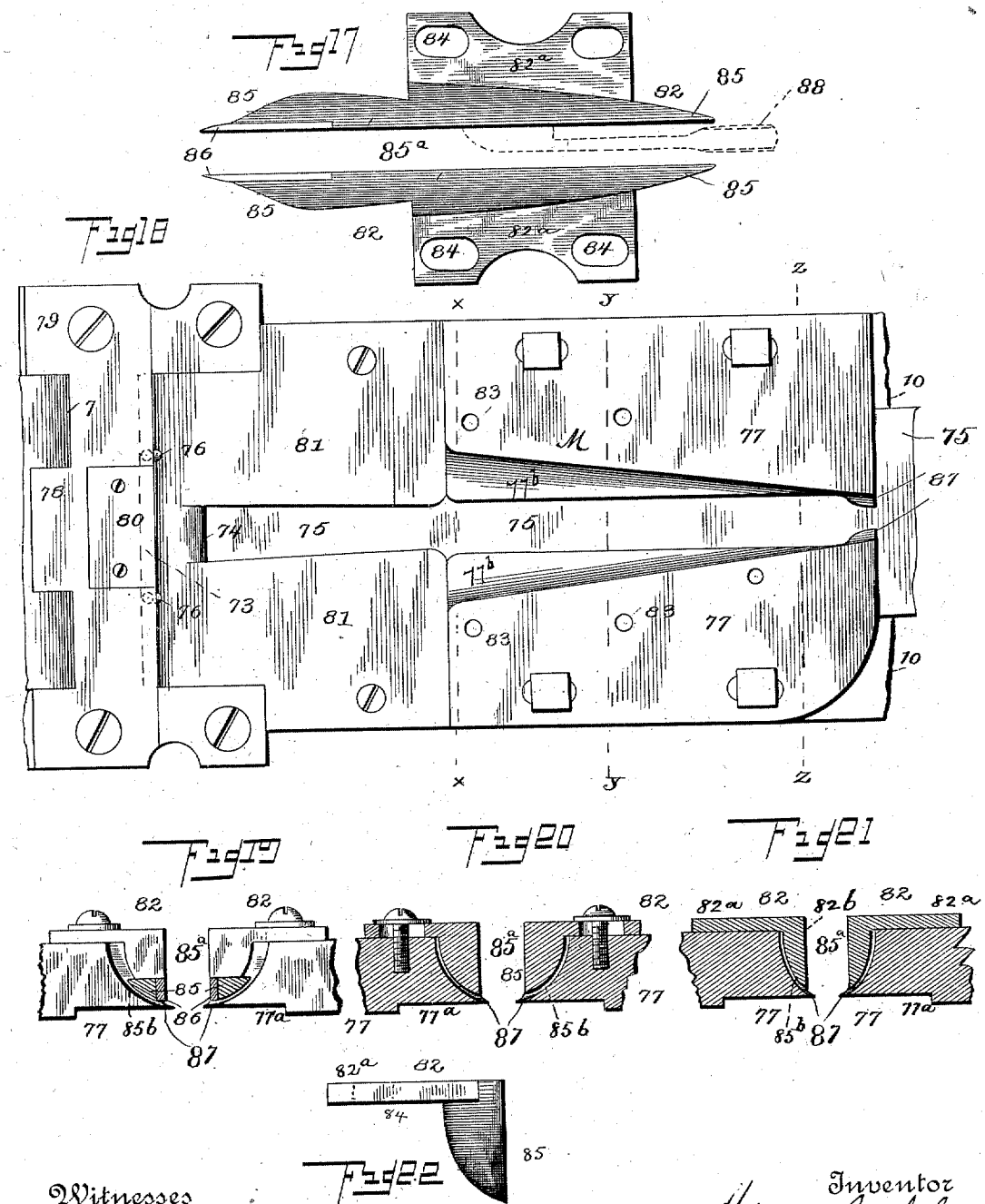

(No Model.)
11 Sheets—Sheet 11.
H. BOHLS.
CIGARETTE MACHINE.
No. 554,575.
Patented Feb. 11, 1896.
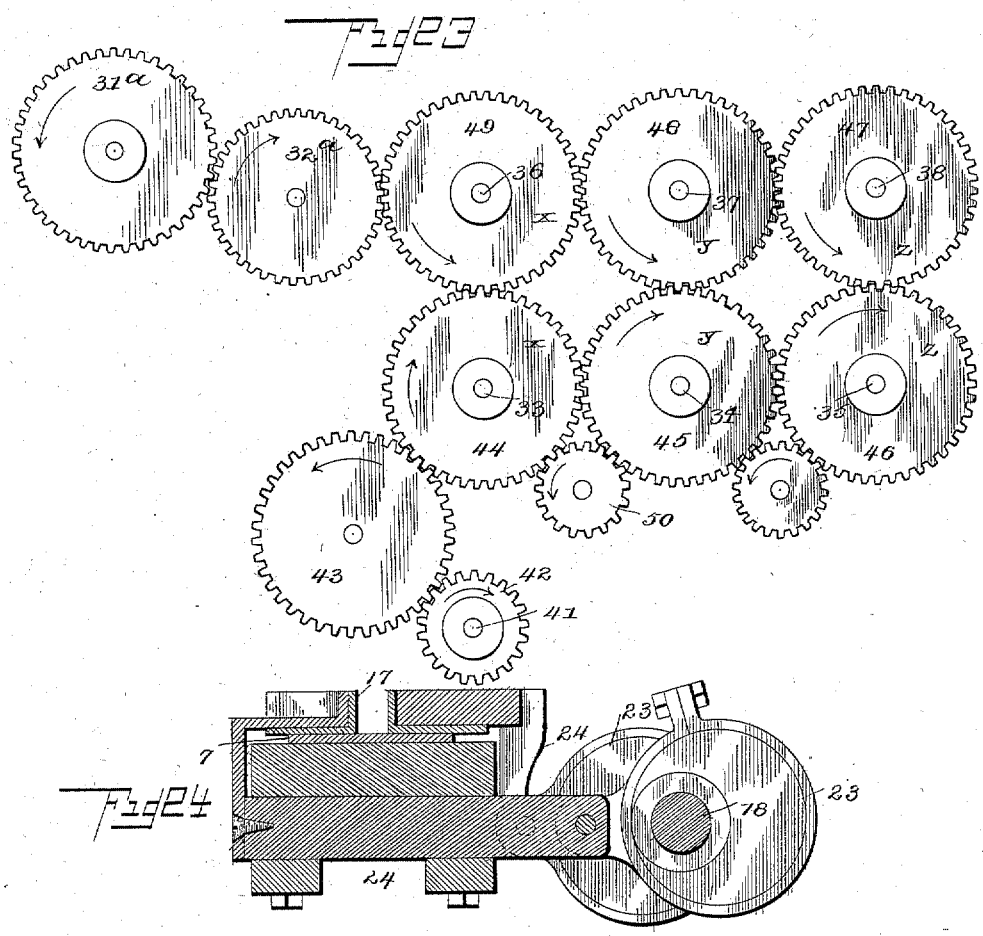
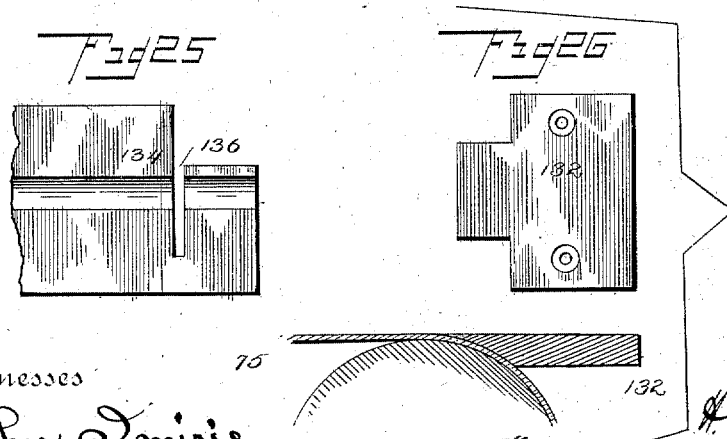
Witnesses
John Tmirie
E. Cuse
Inventor
Henry Bohls,
By
Attorneys

UNITED STATES PATENT OFFICE.

HENRY BOHLS, OF SAN FRANCISCO, CALIFORNIA, ASSIGNOR TO THE BOHLS CIGARETTE MACHINE COMPANY, OF RICHMOND, VIRGINIA.

CIGARETTE-MACHINE.

SPECIFICATION forming part of Letters Patent No. 554,575, dated February 11, 1896.

Application filed July 6, 1891. Serial No. 398,530. (No model.) Patented in England March 7, 1893, No. 4,962.

*To all whom it may concern:*

Be it known that I, HENRY BOHLS, of San Francisco, in the county of San Francisco and State of California, have invented certain new and useful Improvements in Cigarette-Machines, of which the following is a specification, reference being had to the accompanying drawings, and to the letters and figures of reference marked thereon.

This invention (which forms the subject of British Letters Patent, No. 4,962, dated March 7, 1893) relates to devices and mechanisms, and combinations of the same, for producing and wrapping a continuous roll or filler of shredded tobacco into the form of a continuous cigarette and cutting it into definite lengths.

Briefly described, the machine embraces the following principal elements: an endless carrier-belt upon which the tobacco is deposited from the feeding devices, (not shown,) which belt runs upon the top of a continuous table, in part open, formed in several sections, and supported by the main frame of the machine; guard-plates for directing the tobacco to the center of said belt; a top or presser endless belt for flattening or compressing the tobacco as it is being formed into a filler; a pair of reciprocating compressing-jaws working over and upon the carrier-belt to give lateral compression to the tobacco; a pair of spring-guides which lead to a series of grooved shaping-wheels revolving on vertical axes, between which wheels and the carrier-belt and the top or presser belt the tobacco is finally shaped into a filler; scrapers for clearing the grooves of the shaping-wheels and for guiding the filler through the series thereof; means for feeding a paper wrapper to the moving filler so that the latter shall be properly deposited upon it; a mouthpiece that receives the filler and wrapper, and is provided with devices which guide the filler from the last of the series of shaping-wheels, curve the wrapper to a U shape, and press the filler to the bottom of the wrapper; a folder having devices adapted, as the filler and wrapper are received from the mouthpiece, to gradually turn over the wrapper upon the filler, the wrapper encircling said pressing devices; a knife-edged pasting-wheel revolving upon a vertical axis and acting with the last of the series of said pressing devices to enter the fold of the wrapper and apply a film of paste thereto, the paste being fed to the wheel by suitable means; a presser-wheel arranged in advance of the pasting-wheel, adapted to compress the pasted fold; a top endless presser and delivery belt which runs on the top of the open table and acts with a lower endless delivery-belt to convey the continuous cigarette to the discharge end of the machine, and, lastly, a cutting mechanism for severing the continuous cigarette into suitable lengths, all the mechanisms being geared so as to run with the desired speed and uniformity to produce a continuous operation.

In the drawings, Figure 1 is a front side view of the machine. The remaining figures are upon enlarged scale. Fig. 2 is a view of the machine seen from the feeding end. Fig. 3 is a plan showing the same end of the machine. Fig. 4 is a similar view showing the other or delivery end of the machine. Figs. 5 and 6 are side elevations of portions of the machine. Fig. 7 is a part plan showing the grooved wheels for shaping the tobacco, the top or presser belt seen in Fig. 6 being removed. Fig. 8 is a similar view showing the mechanism for continuing the folding of the wrapper after leaving the mouthpiece, where the folding begins. Fig. 9 is a longitudinal section showing parts illustrated in Fig. 8 enlarged. Figs. 10, 11, 12, 13, 14, and 15 are sectional views showing the devices for folding the wrapper around the filler. Fig. 16 shows a continuation of Fig. 9. Fig. 17 is a bottom plan view of the upper part of the mouthpiece. Fig. 18 is a top plan view of the under part of the mouthpiece upon which the part shown in Fig. 17 rests. Figs. 19, 20, and 21 are cross-sections of the mouthpiece on the lines $x\, x$, $y\, y$, and $z\, z$, respectively. Fig. 22 is a front end view of one of the parts 82 seen in Fig. 17. Fig. 23 shows the gearing for driving the grooved shaping-wheels and top or presser belt. Fig. 24 is a view, partly in section, of the compressing-fingers seen in Fig. 7. Fig. 25 is a top view of the delivery-passage along which the cigarette passes to the cutter and the support for the cigarette while being cut. Figs. 26, 27, 28, 29, 30, 31, and 32 are detached details.

The frame of the machine is shown by 1, 2, and 3. All the working parts are driven from the principal shaft 4, which receives motion from any suitable prime shaft or motor through the medium of a belt and pulleys, the prime-shaft pulley being connected to it by a clutch 5, worked from the front of the machine by a hand-lever 6.

The carrier-belt 7 passes around rollers 8 and 9, Figs. 1, 3 and 9, the former being suitably supported on the frame of the machine just beyond the end of the table 10 and so arranged as to bring the upper half of the belt onto said table. The roller 9 is carried by the shaft 11, Fig. 3, which is driven by the main shaft 4 through the gears 12 13, thus imparting motion to the carrier-belt 7. As the carrier-belt 7 moves onward, it receives the tobacco from the feeding devices between the guard-plates 14 15, secured by clips 16, Fig. 3, for bringing it to the middle of said belt, so that it will pass between the curved compressing-jaws 17, Figs. 3, 7 and 24, which are operated in the following manner:

A short counter-shaft 18 is driven from the main shaft 4, and geared up to high speed by spur-gears 19, 20, 21 and 22. The shaft 18 carries a pair of eccentrics 23, the straps of which are connected to bars 24. The jaws 17 extend over the carrier-belt 7, as seen in Fig. 24. The jaws may be called "front" and "rear" jaws, and they reciprocate transversely of the said belt to even up the tobacco, the movements of the jaws being in opposite directions, so that they shall alternately approach and retreat from each other. These jaws, thus acting from opposite sides against the moving tobacco, condense and bring it into a narrow strip along the center of the carrier-belt 7.

From the jaws 17 the tobacco passes, Figs. 3 and 7, between the spring-guides 25 toward the first pair of the shaping-wheels 26, it having, however, first passed under the top or presser belt 27, and being pressed to the thickness of the cigarette between the said top presser-belt and the carrier-belt 7. By the shaping-wheels 26, Figs. 3, 6, and 7, the tobacco is formed into a continuous filler of suitable form, it being then carried regularly forward by them and the belts, all of which have uniform speed. The tobacco having been evened up, condensed and brought into a narrow strip by the action of the jaws is, after passing them, allowed by its own elasticity to slightly expand, when it is caught by the converging spring-guides 25 and by them gradually condensed so as to be prepared for proper delivery to the first pair of shaping-wheels. This series of operations upon the tobacco cannot, it is evident, be effected except by the relative arrangement of reciprocating jaws, spring-guides and shaping-wheels, as here shown.

The top or presser belt 27 passes around rollers 28 29 and under idlers 30 and 30×, Figs. 1, 3, and 6. The roller 28 is of larger diameter than the roller 29, and it and the idler 30× are journaled in higher horizontal planes than the roller 29 and idler 30. The two latter revolve in a common horizontal plane to bring that part of the belt 27 traveling between them parallel with the carrier-belt 7. The top or presser belt is driven indirectly from the main shaft 4 through the medium of gears 31 32 and 31ª and 32ª, Figs. 1, 2, 3, 6 and 23.

The grooved shaping-wheels 26, Figs. 3, 6, and 7, are mounted on shafts 33 34 35 36 37 38 and driven by the train of gearing shown in Fig. 23. The motion is communicated from the main shaft 4 by the bevel-gears 39 40, Fig. 3, the latter of which is double toothed and engages with the gear of a vertical shaft 41, Fig. 23, upon which the gear 42 or driver of the train is mounted. The spur-gear 42 engages the larger gear 43, it in turn engaging the first gear 44 of the six corresponding gears (44 to 49) mounted upon the shafts 33 to 38 of the shaping-wheels, Fig. 7. A side view of the train of gearing is given in Fig. 6, from which it will be seen that the gear 44 engages the wide-faced pinion 50, it in turn engaging the gear 45, and that a similar pinion engages the gear 46. The opposite gears of the six of the series are only engaged with each other, as $x$ with $x$, $y$ with $y$ and $z$ with $z$. The grooved shaping-wheels, driven by the train of gearing described, move with a positive motion and at a speed uniform with that of the carrier and presser belts.

The wheels 26 are preferably arranged so that the space between each pair shall be gradually diminished to reduce the size of the filler as it passes through the series.

The wheels 26, after the tobacco is pressed to a suitable thickness, serve to shape it as it is carried along by them and the carrier and top or presser belts. It is well known that tobacco will exude a gummy matter while being pressed, and to prevent clogging or the closing of the grooves or faces of the shaping-wheels I provide a series of scrapers 52 53 54 55 56 57. The scrapers 52 53 are concavo-convex, Fig. 28, to fit in the grooves of the wheels 26, and are secured to the table 10, upon which the carrier-belt travels. The table 10, in its different sections, extends the whole length of the machine, being supported from the part 3 of the frame by the standards 58 59 60 61. (See Fig. 1.) The scrapers 53 serve a purpose similar to that of those 52, but are secured to the standards 62, extending vertically from the table. The scrapers 54 55 are journaled on shafts 63 in bearings 64 attached to the part 2 of the frame of the machine, and made adjustable by means of set-screws 65 passing through the arms 66.

(See Figs. 6 and 7.) The scrapers 56 57 are secured to posts 67 fastened to the part 3 of the frame, and also made adjustable by means of set-screws, so as to press against the shaping-wheels with more or less force.

The grooves of the shaping-wheels may be of any desired depth, width or shape to suit the quality of the tobacco used and give the cigarette the desired size and shape. The scrapers 54 55 56 57 are not hollowed out, but shaped to fit the grooves of the wheels. Those 52 53 are made concave to suit the shape of the filler that passes between their faces, and also convex to fit the grooves of the shaping-wheels. The construction of the shaping-wheels may be such that the continuous filler shall be made round, oval or square in cross-section or of other shape.

In my Patent No. 445,036 I have shown in Fig. 11 of the drawings modifications in the operative faces of the endless chains forming the compressing or forming device of that patent, enabling them to produce a filler having a shape other than round in cross-section, the said chains being intended to perform the same function here described as attending the use of the shaping-wheels.

Secured to the under side of the part 3 of the frame is a standard 68, upon which is mounted the reel 69 containing the roll of paper 70, Figs. 1 and 5. The ribbon or strip of paper 71, forming the wrapper, passes under the guide-idler 72, secured to the frame of the machine, thence through a slot 73, Figs. 9 and 18, at the curved plate 74, and along over the flat lower endless delivery-belt 75 toward the delivery end of the machine. This lower delivery-belt 75 runs over a roller $75^a$, driven by suitable gearing from the main shaft 4, and over the smaller roller $75^b$, Fig. 9. The belt may be tightened by means of an adjustable idler $75^c$, Fig. 1. The play of the wrapper in the slot 73 is limited by the pins 76 fastened in the plate 81, which pins stand at an angle. After the wrapper has passed through the slot 73 it enters the mouthpiece, Figs. 17 to 22, inclusive, bolted to the table 10.

In Fig. 9 the endless carrier-belt 7 is shown passing beneath the plate 78 fastened to the table 10 by screw-bolts 79. The plate 78 is reinforced by a supplemental plate 80, made removable for replacement when worn. The filler, which is now in the form of a rod, having reached the plates 78 80, passes onto the wrapper, which is emerging through the slot 73, and the wrapper, with the filler-rod thereon, having partly crossed the plate 81, enters the mouthpiece M. This mouthpiece consists of lower twin sections, 77, and upper twin sections, 82. The sections 77 are bolted to the table 10, as shown in Figs. 7 and 18, a suitable space being left between them for the passage of the filler-rod. Each section 77 is cut away on its lower face, as indicated by $77^a$, Figs. 19, 20 and 21, to form a space for the passage of the delivery-belt 75. In the inner side of each of the sections 77 is formed a concave recess $77^b$, which recess tapers from the front to the rear ends of the sections. Each section 77 is also provided at its rear end with a projection 87, concave on its upper face, as shown in Figs. 18, 19, 20 and 21. The twin sections 82 (shown upside down in Fig. 17) each has a plate portion $82^a$ provided with slots 84 and a downwardly-extending prong or portion 85 having a convex face to project into the concave recesses of the lower sections, 77. The upper and lower sections, 82 and 77, are secured together by bolts, which pass through the slots 84 in the upper sections and holes 83 in the lower sections. The slots 84 permit lateral or longitudinal adjustment of the upper sections relatively to the lower ones. The convex-faced prongs or portions 85 extend at both ends beyond the plate portion 82, and are provided at their forward ends with points 86, which project into the grooves of the last pair of shaping-wheels 26. When the upper and lower sections of the mouthpiece are secured together, a channel $85^a$, open at the top and closed at the bottom by the delivery-belt 75, will be formed, and through this channel the filler-rod will be carried on the wrapper. A curved space $85^b$ will also be formed between the convex walls of the upper sections and the concave walls of the lower sections, through which space the wrapper 71 will be carried.

The arrangement of the mouthpiece with reference to the shaping-wheels 26 is shown in Figs. 7 and 9, it being seen that the wheels rest upon the top of the carrier-belt 7 and that the advanced pair rest also upon the plates 78 80 81. (See Figs. 3, 7, and 9.) The wrapper, having entered the mouthpiece, now assumes the curvature of the spaces $85^b$ between the walls of the sections 77 and 82, as indicated in Figs. 19, 20, and 21, while the tobacco rod is carried on the wrapper along the channel $85^a$ of the mouthpiece. The function of the points 86, Figs. 7, 9, and 17, is to strip the rod from the last pair of shaping-wheels and guide it to the other parts of the mouthpiece. The wrapper, as it emerges from the mouthpiece, is pressed up and given a firm support immediately beneath the rod by means of the projections 87.

The function of the lower delivery-belt, 75, as a carrier of the wrapper and filler, ceases as the belt reaches the end of the mouthpiece.

Referring now to Figs. 7, 9, and 17, it will be seen that to one of the sections 82 of the mouthpiece is adjustably secured a finger 88, extending forwardly and downwardly between the prongs 85 of the parts 82 of the mouthpiece, the function of which is to press the tobacco rod down to the wrapper, that a similar finger 89, Fig. 10, is adjustably attached (at the hole $89^\times$, Fig. 7) to the part 77, having a like function, and that a third finger 90, Fig. 11, attached to the angular guide hereinafter described, additionally holds down the tobacco as the paper incloses the tobacco rod and the second and third fingers during the advance of the operation. As the wrapper and tobacco rod pass from the mouthpiece they enter between two sides of a laterally-adjustable two-part angular guide A. (Shown in plan in Fig. 8 and in cross-section at various points in its length in Figs. 10 and 11.) The two sides of the angular guide, which are separate, are designated by 91 and 92. At the bottom of the space between the sides, Fig. 10, is a gutter 93, which may be separate from or attached to the guide, the curvature of the gutter being such as to give the proper shape to the lower portion of the continuous cigarette, which the filler and wrapper now constitute, except as to the pasting.

It is obvious that the shape of the gutter will be made to agree with the form of the cigarette to be operated upon.

In Figs. 10 to 14, inclusive, are shown, located between the separated sides 91 92 of the angular guide and on the adjustable plates 99 and 100, hereinafter described, the folders 93 94 and 95 96, respectively, which complete the folding of the wrapper to cylindrical form.

The presser-foot 97, Fig. 14, is for the purpose of holding the edge of the wrapper upon the pasting-wheel 98. The laterally-adjustable plates 99 and 100, carrying the folders 95 96 and presser-foot 97, are curved, as shown, to inclose or surround a part of the lower circumference of the cigarette, the purpose of the adjustability of the plates being to regulate the pressure upon the continuous cigarette and tighten or loosen the wrapper around the filler. The purpose of the adjustability of the angular guide, upon which the adjustable plates 99 and 100 are mounted, is to admit the further regulation of the tension and the adjustment of the machine to cause the continuous cigarette to run in a right course.

The pasting-wheel 98, Figs. 5 and 14, is given a knife edge to allow it to enter between the folded edges of the wrapper, and is driven in the following manner: Attached to the back part, 2, of the frame and extending over the table 10 (see Fig. 4,) is an arm 101, which forms the bearing of a vertical shaft 102, upon which the pasting-wheel is mounted, said shaft having a sheave 103 at the upper end, over which a belt 104 passes from a sheave 105 mounted on the main shaft 4. The paste is applied to the pasting-wheel 98 by means of an endless thread 106 passing over a large sheave 107, Figs. 4 and 5, and a small sheave 108, it also passing under the idler 109. The endless thread 106 passes over a wheel 110 partly immersed in paste contained in the trough 111. By means of these devices the paste is spread upon the pasting-wheel 98 in a thin and uniform film. 106ª is a standard holding the idler 108, over which the thread 106 returns, the idler being adjustable vertically, horizontally, and to and from the pasting-wheel, so as to move the thread over, upon or away from said wheel to paste a wide or narrow fold. (See Figs. 1, 4, and 5.) Motion is imparted to the wheel 110 by means of a belt 112 passing over the sheaves 113 114, the latter being upon the shaft 115, which is driven from the main shaft by a system of gearing.

Upon the shaft 102 is a gear 116, which engages a gear 117 upon an adjacent shaft, which latter has at its bottom a flat presser-wheel 118 placed in the line of movement of the continuous cigarette, in advance and at one side of the pasting-wheel. The function of this presser-wheel 118 is to smooth down the pasted edges of the wrapper.

Pivoted at 119 to the side of the paste-trough 111 is an arm 120, carrying a rubber or other scraper 121, which fits against the thread 106 and is made adjustable in a slotted guard 122 by means of a set-screw 123, which screws into the arm 120. By these means the quantity of paste fed to the pasting-wheel may be accurately regulated. (See Figs. 5 and 5ª.) The continuous cigarette, having left the presser-wheel 118, is brought between the lower endless delivery-belt, 75, and the top endless presser and delivery belt, 124, (shown particularly in Figs. 1, 4, and 5,) and which travels over and upon the laterally-adjustable side plates 125, which are supported by the table 10. The plates 125 are separated and adjusted to the required size of the cigarette by means of bolts 126 passing through slots 127 into the table. The plates 125 are a continuation of the adjustable guide having the sides 91 and 92, Fig. 8, and extend to near the delivery end of the machine. The belt 124 is kept in a line parallel to the table 10 and the plates 125 by rollers 129, the belt being driven by the pulley 130 and returning over the pulley 131. The pulley 130 is mounted upon the shaft 115. The rollers 129 are in bearings resting upon one of the plates 125, and made vertically adjustable to give more or less pressure to the belt 124.

In Fig. 26 is shown a plate 132 which is so located with relation to the roller 75ª as to relieve the continuous cigarette from the lower delivery-belt, 75, of said roller. As the movement of the continuous cigarette continues, the spring-finger 133, Fig. 4, is reached, which holds the continuous cigarette down while being cut. The block 134 (shown in plan in Fig. 25) serves to support the outer end of the cigarette while being cut, the circular knife 135 in its rotation entering the slot 136.

The circular knife 135, Fig. 2, is placed at the end of an extensible arm 138 revolving on the shaft 139. The arm is provided with a counterweight 140 to prevent vibration in its circular swing.

The arm 138 is made extensible or in two parts united by a sliding joint, as seen at 141 and in the detached view at the end of the arm, Fig. 2, for the purpose of lengthening or shortening it to suit the diameter of knife used.

The knife-arm shaft 139 is geared to the main shaft 4, as shown in Fig. 4, to revolve with a speed determined by the length of cigarette to be cut. The knife 135 has rotation independently of that of the arm 138, and is geared up to high speed, its independent rotation being effected by means of the loose sheave-pulley 141 on the shaft 139 and the belt 142 running over the small pulley 143. Figs. 1, 2 and 4 show the pulleys and belting for giving speed to the circular knife independently of the rotation of the knife-arm. The cutting devices, for safety, are covered by a hood 144. A guard 150 is used to keep small particles of tobacco from coming in contact with the under side of the carrier-belt 7 in its return movement.

A belt 145 is driven from the main shaft 4, and in turn drives the shaft 146, upon which is a pulley 147, whose belt 148 drives the loose pulley 149 attached to the sheave 141, hereinbefore mentioned.

Having described my invention, I claim—

1. In a cigarette-machine, an endless carrier-belt, a top or presser endless belt above the carrier-belt, grooved shaping-wheels mounted to revolve between the two belts, wrapper-feeding devices, a mouthpiece adapted to receive the filler-rod and wrapper and partially curve the latter around the rod, and scrapers extending from the mouthpiece into the grooves of the adjacent shaping-wheels, to strip the filler-rod therefrom and guide it into the mouthpiece onto the wrapper, substantially as set forth.

2. In a cigarette-machine, an endless carrier-belt, a table upon which said belt runs, guard-plates for directing the tobacco to the center of said carrier-belt, a top or presser endless belt, a pair of reciprocating compressing-jaws, a series of pairs of shaping-wheels revolving on vertical axes, a pair of spring-guides between said jaws and the first pair of shaping-wheels, and scrapers for clearing the shaping-wheels and guiding the filler-rod through the series thereof, combined with a mouthpiece that receives the filler-rod and wrapper, and is provided with devices for stripping and guiding the filler-rod from the last pair of the shaping-wheels, curving the wrapper to a U shape and pressing the filler-rod to the bottom of the wrapper, and folding, pasting, delivery and cutting devices, substantially as set forth.

3. In a cigarette-machine, an endless carrier-belt, a table upon which said belt runs, a top or presser endless belt above the carrier-belt, shaping-wheels revolving between said belts for making a filler-rod, means for feeding the paper wrapper to the moving filler-rod, a mouthpiece provided with means for stripping the filler-rod from the last pair of shaping-wheels, and that receives the filler-rod and wrapper and partially curves the wrapper around the filler-rod, and folders to completely turn over the wrapper upon the filler-rod, combined with pasting, pressing, delivery and cutting mechanism, all of said moving parts being timed to produce uniformity of action in a continuous operation, substantially as set forth.

4. In a cigarette-machine, an endless carrier-belt, a top or presser endless belt above the carrier-belt, shaping-wheels arranged to revolve between said belts on vertical axes and devices arranged between the shaping-wheels to guide the filler-rod, combined with a pronged mouthpiece provided with devices for stripping and guiding the filler-rod from the last pair of shaping-wheels, curving the wrapper to a U shape and pressing the filler-rod to the bottom of the wrapper, folders for further turning over the wrapper upon the filler-rod, and pasting, fold-compressing, and delivery mechanisms, substantially as set forth.

5. In a cigarette-machine, an endless carrier-belt, a table upon which said belt runs, guard-plates for directing the tobacco to the center of said carrier-belt, a pair of reciprocating compressing-jaws working over and upon the carrier-belt, a series of shaping-wheels revolving above and upon the carrier-belt on vertical axes, a pair of spring-guides 25 between the compressing-jaws and the first pair of shaping-wheels, scrapers for clearing the shaping-wheels and guiding the filler-rod through the series thereof, and a top or presser endless belt above the said wheels, combined with means for feeding a paper wrapper to the machine, which wrapper receives the filler-rod from the carrier-belt and shaping-wheels, a pronged mouthpiece through which the wrapper and filler-rod are carried and which partially curves the wrapper around the filler-rod, suitable devices to complete the folding of the wrapper around the filler-rod and the pasting of the edges of the wrapper, and means to convey the continuous cigarette to a cutting mechanism, substantially as set forth.

6. In a cigarette-machine, an endless carrier-belt, a table upon which said belt runs, a top or endless presser belt above the carrier-belt, shaping-wheels adapted to revolve between said belts on vertical axes, to form a filler-rod, means for feeding a paper wrapper to the moving filler-rod, a mouthpiece that receives the filler-rod and wrapper and partially curves the wrapper around the filler-rod, said mouthpiece being provided with prongs for stripping the rod from the last pair of shaping-wheels and guiding the same forward, a folder adapted, as the wrapper and filler-rod are received from the mouthpiece, to further turn over the wrapper upon the filler-rod, a pasting device and means for supplying paste thereto, a presser-wheel mounted upon a vertical axis and adapted to compress the pasted fold of the wrapper, a top endless presser and delivery belt which runs on the top of the table, a lower endless delivery-belt acting with the top belt to convey the continuous cigarette toward the discharge end of the machine, and a cutting mechanism for severing the continuous cigarette into suitable lengths, all combined with gearing for giving to the respective moving mechanisms the desired speed and uniformity of action to produce a continuous operation, substantially as set forth.

7. In a cigarette-machine, filler-rod-forming and wrapper-feeding devices, combined with a mouthpiece to receive the wrapper and filler-rod, said mouthpiece consisting of twin upper sections and twin lower sections, each section being independent of, and capable of adjustment relative to, the others, the latter being secured to a support on the machine and each provided with a concave recess, and the former secured to the lower sections, and each having a downwardly-projecting portion with a convex face to project into the concave recesses in the lower sections, the sections being so secured together and to the table as to leave a curved space between the upper and lower sections for the passage of the wrapper and a channel between the upper sections for the passage of the filler-rod onto the wrapper, whereby the wrapper shall be partially curved around the filler-rod when they emerge from the mouthpiece, and suitable devices to complete the folding of the wrapper on the filler-rod and to paste the edges of the wrapper, substantially as described.

8. In a cigarette-machine, a series of pairs of shaping-wheels driven at uniform speed by gearing, the opposite gears of the train being engaged with each other, and the adjacent pairs of gears being in different planes, combined with wide-faced pinions for engaging the gears of adjacent pairs on one side of the train, substantially as specified.

9. In a cigarette-machine, a mouthpiece consisting of upper and lower twin sections, each of the sections being independent of the others, the lower twin sections 77 each having in its inner side a concave recess tapering from the front to the rear end and provided with the projections 87, and the upper twin sections 82 having plate portions 82$^a$ and downwardly-extending prongs 85, each of the latter having a convex face corresponding, substantially, in outline to the concavities in the lower sections, and suitable devices to adjustably secure the sections relatively to each other, a space being left between the concave and convex surfaces of the upper and lower sections, and a channel formed between the opposite pairs of sections, combined with a suitable carrying device located beneath the lower twin sections, and a pressing device, as 88, in the channel, substantially as set forth.

10. In a cigarette-machine, an endless carrier-belt, a top or presser endless belt above the carrier-belt, grooved shaping-wheels mounted to revolve between the two belts, and wrapper-feeding devices, combined with a mouthpiece adapted to receive the filler-rod and wrapper and partially curve the latter around the former, and points projecting from the mouthpiece into the grooves of the last pair of shaping-wheels to strip the filler-rod therefrom and guide it into the mouthpiece onto the wrapper, substantially as set forth.

11. In a cigarette-machine, filler-forming, and wrapper-feeding devices, combined with a mouthpiece consisting of upper and lower parts united together and having a U-shaped space between them through which the wrapper moves, the upper part having a channel along which the filler passes on and with the wrapper, curved projections extending into the channel from the opposite sides of the mouthpiece at its delivery end to support the wrapper, and a presser-finger extending over the projections to press the filler onto the wrapper, substantially as set forth.

12. In a cigarette-machine, filler-rod-forming and wrapper-feeding devices, combined with a mouthpiece through which the wrapper and filler-rod pass, said mouthpiece having devices, substantially as described, to partially curve the wrapper around the filler-rod, an angular guide consisting of two adjustable sides between which the wrapper and filler-rod pass from the mouthpiece, pressing-fingers extending down between the sides of the guide onto the filler-rod, folders attached to the said sides to engage the wrapper and completely turn its edges over upon the filler and the fingers, and devices to paste the edges of the wrapper, as set forth.

13. In a cigarette-machine, filler-rod-forming and wrapper-feeding devices, combined with a mouthpiece through which the wrapper and filler-rod pass, said mouthpiece having devices, substantially as described, to partially curve the wrapper around the filler-rod, an angular guide consisting of two adjustable sides between which the wrapper and filler-rod pass from the mouthpiece, a gutter connected to said guide to shape the lower portion of the continuous cigarette, pressing-fingers extending down between the sides of the guides, one of said fingers pressing on the filler-rod and the other on one of the turned-over edges of the wrapper, folders attached to the said sides to engage the wrapper and completely turn its edges over onto the filler-rod and the fingers, and devices to paste the edges of the wrapper, as set forth.

14. In a cigarette-machine a pasting-disk revoluble in substantially a horizontal plane, a paste-trough, and a wheel revoluble in said trough in substantially a vertical plane, combined with a traveling endless thread passing over the wheel in the trough and engaging the edge of the pasting-disk, a scraper interposed between the wheel in the trough and the pasting-disk to engage the thread and remove the surplus paste therefrom, and suitable means to drive the thread, the pasting-disk and the wheel, substantially as described.

15. In a cigarette-machine, a revoluble pasting-disk, a paste-trough and a wheel revoluble in the trough, combined with a traveling endless thread passing over the wheel in the trough and engaging the edge of the disk, an arm pivoted on the trough, a scraper carried by said arm and engaging the thread between the wheel and the disk, suitable devices to adjust said arm, and suitable means to drive the thread, the pasting-disk and the wheel, substantially as described.

16. In a cigarette-machine, the combination of filler-rod-forming and wrapper-feeding devices, of a mouthpiece through which the wrapper and filler-rod pass and by which the wrapper is partially curved around the filler-rod, a guide consisting of the adjustable sides 91, 92, between which the wrapper and filler-rod pass from the mouthpiece, devices connected to said sides to shape the lower portion of the continuous cigarette and complete the folding of the wrapper around the filler-rod, devices to paste the edges of the wrapper, a presser-wheel to smooth down said pasted edges, laterally-adjustable plates 125 between which the continuous cigarette passes from the pasting and smoothing devices, a top endless presser and delivery belt working upon and over the plates 125, a lower endless delivery-belt, and cutting mechanism, substantially as described.

17. In a cigarette-machine, the combination, with a cutting device, of a spring-finger 133 adapted to bear on the continuous cigarette to maintain it in position during the cutting operation, substantially as set forth.

18. In a cigarette-machine, the combination, with a knife having a rotary movement, of a block on which the outer end of the cigarette is supported, said block having a slot in which the knife rotates, and a spring-finger to bear on the continuous cigarette and maintain it in position during the cutting operation, substantially as described.

In testimony whereof I have hereunto set my hand and seal.

HENRY BOHLS. [L. S.]

Witnesses:
 WM. J. PAYNE,
 R. B. T. CURTIS.